Feb. 24, 1925.  1,527,413
F. J. HINDERLITER
BIT HOOK
Filed May 26, 1923
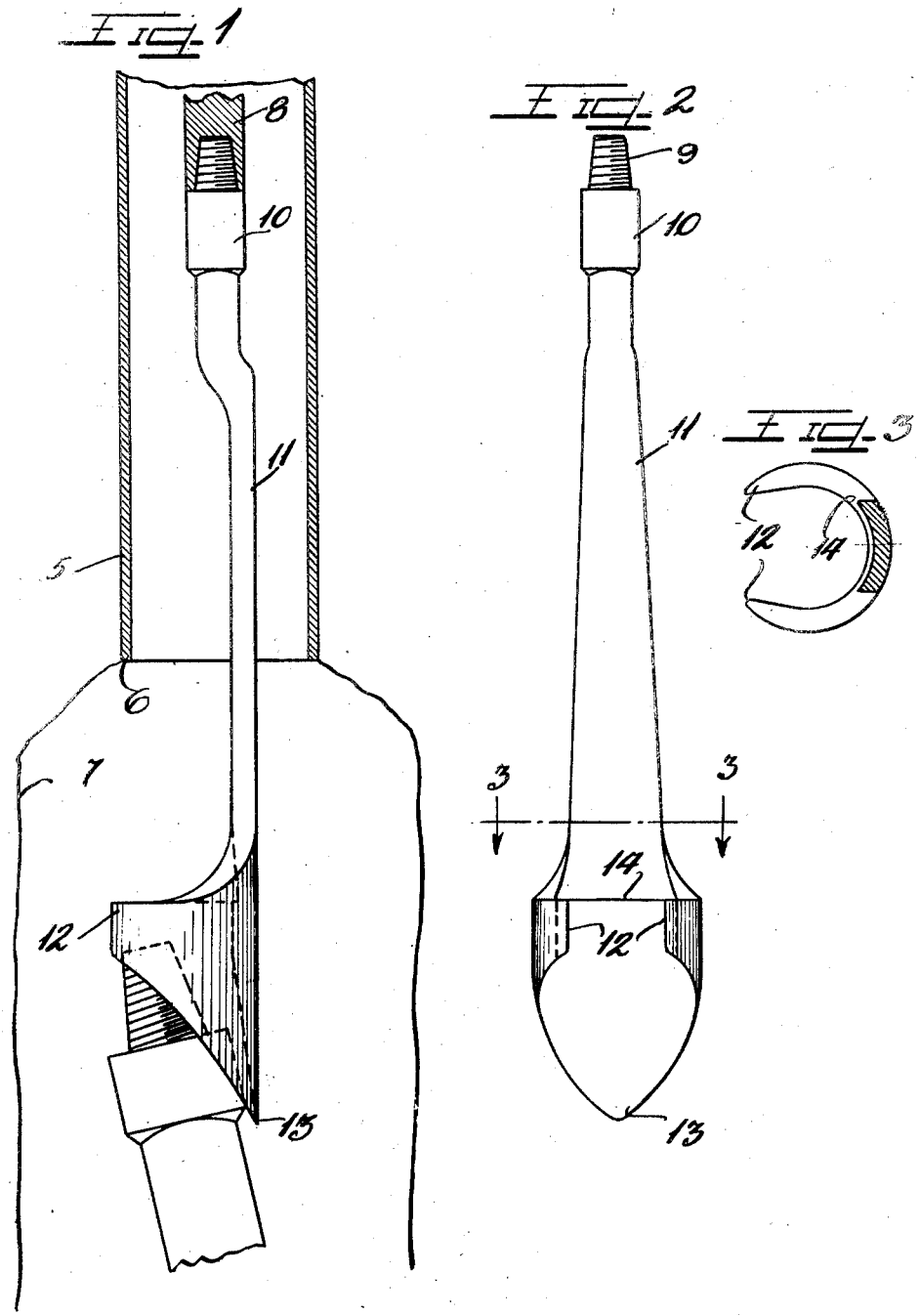

Patented Feb. 24, 1925.

1,527,413

UNITED STATES PATENT OFFICE.

FRANK J. HINDERLITER, OF TULSA, OKLAHOMA.

BIT HOOK.

Application filed May 26, 1923. Serial No. 641,637.

*To all whom it may concern:*

Be it known that I, FRANK J. HINDERLITER, a citizen of the United States, and a resident of the city of Tulsa, in the county of Tulsa and State of Oklahoma, have invented certain new and useful Improvements in a Bit Hook; and I do hereby declare that the following is a full, clear, and exact description of the same, reference being had to the accompanying drawings, and to the numerals of reference marked thereon, which form a part of this specification.

This invention relates to so called fishing tools in the bottom of deep wells, and particularly to such tools for use with cable drilling rigs, wherein such a hook is attached at the end of either a right or left lay rope.

Heretofore it has been necessary to use a left hand hook with a right hand lay rope and vice versa, so that the hook can follow the lay of the rope when lowering into the well. Such single hooks frequently lodge on top of a bit or tool instead of sliding over the head into an engaging position.

It is an object of this invention to combine in a single tool features that will overcome the above outlined defects in the tools at present in use.

It is another object of this invention to provide an offset double bit hook whereby the string of tools will be held to one side of the casing until the hook swings clear of the bottom of the casing, whereupon the tools will swing to the center, carrying the offset hook out beyond the limits of the casing.

It is another object of this invention to provide a tapered point merging into the hook portions, whereby the recovering tool will not be apt to lodge on top of the lost tools but will tend to slide off the top into a proper engaging position.

Other and further important objects of this invention will be apparent from the disclosures in the specification and accompanying drawings.

This invention (in a preferred form) is illustrated in the drawings and hereinafter more fully described.

On the drawings:

Figure 1 is a section through a drill hole adjacent the bottom of the casing showing a tool embodying features of this invention in position to engage the head of a lost tool.

Figure 2 is a front view of the tool alone.

Figure 3 is a section on the line 3—3 of Fig. 2.

As shown on the drawings:

The reference numeral 5 refers to a deep well casing ending at 6 with a caved in portion of a drill hole below the casing represented at 7. The bottom socket of a string of fishing tools is shown at 8, into which is screwed the usual pin 9 on collar 10 of the bit hook of this invention. This device comprises an offset shank 11 integral with the collar and pin and terminating in a double hook 12 offset in the opposite direction and preferably approximating the inside diameter of the casing so that when it clears the casing it will be carried farther out into the hole by the tools swinging into the center of the casing. The hooks 12 comprise an open sided cylindrical segment so formed as to gradually taper from the points of the hooks to a meeting point 13 in line with the shank 11. This taper is important to allow the tool to slide over the lost tools, and to further insure such action the lower edges of the hooks are drawn out to a more or less sharp edge. A shoulder 14 is carried all around at the top inside surfaces of the hooks by slightly recessing the shank.

This device is intended to be used in fishing for lost tools in deep wells and the double hooks 12 permit the tool to turn either way, right or left, according to the kind of a wire line it is being run on, that is, whether a right or left lay line. Further the long point and the gradual taper to each hook keeps the hook from stopping on top of the bit or tools that are lost. The point and taper turns the hook to one side or the other, making it very easy to hook a bit or string of tools at the bottom of the hole.

I am aware that numerous details of construction may be varied through a wide range without departing from the principles of this invention, and I therefore do not purpose limiting the patent granted otherwise than necessitated by the prior art.

I claim as my invention:

1. A double hook of the class described comprising a coupling end, an offset shank integral therewith, and an offset open sided cylindrical portion on the end of said shank beveled to a point in line with said shank.

2. A fishing tool for the purposes specified including a shank carrying means for attachment to a string of fishing tools and an offset tubular open sided member formed from the material of the shank comprising oppositely disposed hook like members, merging into a depending point.

3. A fishing tool for the purposes specified including a shank carrying means for attachment to a string of fishing tools and an offset tubular open sided member formed from the material of the shank comprising oppositely disposed hook like members forming a flat semicircular shoulder at the junction between the tubular member and the shank, said hook like members merging into a depending point.

In testimony whereof I have hereunto subscribed my name in the presence of two subscribing witnesses:

FRANK J. HINDERLITER.

Witnesses:
  A. G. LOTT,
  HERMAN B. HENDERSHOT.